US006364069B1

(12) United States Patent
Ring

(10) Patent No.: US 6,364,069 B1
(45) Date of Patent: Apr. 2, 2002

(54) ELECTRONIC SENSOR FOR A QUICK RELEASE HAND BRAKE

(75) Inventor: Michael E. Ring, Crown Point, IN (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/876,337

(22) Filed: Jun. 7, 2001

(51) Int. Cl.[7] .......................... F16D 66/00; F16D 65/14
(52) U.S. Cl. ...................... 188/1.11 R; 303/7; 188/107
(58) Field of Search ................. 188/1.11 E, 1.11 R, 188/107; 303/7, 20; 246/167 R

(56) References Cited

U.S. PATENT DOCUMENTS

| 5,586,812 A | * 12/1996 | Kanjo et al. ................. 303/7 |
| 6,170,619 B1 | * 1/2001 | Sheriff et al. ............... 188/107 |
| 6,237,722 B1 | * 5/2001 | Hammond et al. ......... 188/107 |

* cited by examiner

Primary Examiner—Christopher P. Schwartz
(74) Attorney, Agent, or Firm—James Ray & Associates

(57) ABSTRACT

An electronic sensor for a quick release mechanism in a railcar vertical hand brake having a housing equipped with a flexible clamp mounted on an inside wall, and a release shaft having a member disposed perpendicular to and about the circumference thereof. A first element is disposed on the member and interposes with the flexible clamp when the release shaft is rotated to achieve and maintain a full brake release. A second element engages a projection on a ratchet wheel when the operating shaft is rotated to disengage the first element from the flexible clamp. A sensing device is disposed in a predetermined position for detecting when the release shaft is rotated into a release position, and for communicating a signal, indicating that the hand brake is in the release position. A device for activating the sensing device when the release shaft is rotated is disposed in a predetermined position.

20 Claims, 4 Drawing Sheets

ELECTRONIC SENSOR FOR A QUICK RELEASE HAND BRAKE

CROSS-REFERENCE TO RELATED APPLICATION

The invention taught in the present application is closely related to the inventions taught in co-pending patent applications titled "Apparatus For A Quick Release Mechanism In A Railcar Hand Brake", having Ser. No. 09/664,212, filed on Sep. 18, 2000, and "Mechanical Sensor For A Quick Release Hand Brake" filed concurrently herewith and having Ser. No. 08/874,449. These applications are assigned to the assignee of the present application. The teachings of these co-pending patent applications are incorporated herein by reference thereto.

FIELD OF THE INVENTION

The present invention relates, in general, to an electronic sensor for a quick release mechanism for a railroad car vertical hand brake, and more particularly, to an electronic sensor that transmits a signal to the train operator when the hand brake is in the released position.

BACKGROUND OF THE INVENTION

Prior to the present invention, a railroad car vertical hand brake includes a brake release mechanism that provides free release of the brakes by disengaging the winding gear to permit free rotation of the main gear wheel. The quick release mechanism maintains a railcar hand brake in the full release position while the train is moving, preventing worn wheels. However, a railroad operator often has to climb onto the railcar to visually determine that the hand brake is released before moving the train. This procedure can be hazardous to the operator, and time-consuming.

SUMMARY OF THE INVENTION

In a first aspect, the present invention provides an electronic sensor for a quick release mechanism in a railcar vertical hand brake having a housing equipped with a flexible clamp mounted on an inside surface of a wall of the housing, and a release shaft having a member disposed perpendicular to and about a circumference thereof, a first element disposed on the member which interposes with the flexible clamp when the release shaft is rotated to both achieve and maintain a full brake release, and a second element disposed on the member to engage a projection on a ratchet wheel when an operating shaft of the hand brake is rotated to disengage the first element from the flexible clamp to allow a brake application. The electronic sensor comprises a sensing means disposed in a predetermined position for detecting when the release shaft is rotated into a release position and for communicating a signal, indicating that the hand brake is in the release position. A means is disposed in a predetermined position for activating the sensing means when the release shaft is rotated.

In a further aspect, the present invention provides an electronic sensor for a quick release mechanism in a railcar vertical hand brake having a housing equipped with a flexible clamp mounted on an inside surface of a wall of the housing, and a release shaft having a member disposed perpendicular to and about a circumference thereof, a first element disposed on the member which interposes with the flexible clamp when the release shaft is rotated to both achieve and maintain a full brake release, and a second element disposed on the member to engage a projection on a ratchet wheel when an operating shaft of the hand brake is rotated to disengage the first element from the flexible clamp to allow a brake application. The electronic sensor comprises a sensing means disposed in a predetermined position for detecting when the release shaft is rotated into a release position and for communicating a signal, indicating that the hand brake is in the release position. A magnetically charged part is disposed in a predetermined position for activating the sensing means when the release shaft is rotated.

In still a further aspect, the present invention provides an electronic sensor for a quick release mechanism in a railcar vertical hand brake having a housing equipped with a flexible clamp mounted on an inside surface of a wall of the housing, and a release shaft having a member disposed perpendicular to and about a circumference thereof, a first element disposed on the member which interposes with the flexible clamp when the release shaft is rotated to both achieve and maintain a full brake release, and a second element disposed on the member to engage a projection on a ratchet wheel when an operating shaft of the hand brake is rotated to disengage the first element from the flexible clamp to allow a brake application. The electronic sensor comprises a sensing means disposed in a predetermined position for detecting when the release shaft is rotated into a release position and for communicating a signal, indicating that the hand brake is in the release position. A light beam is disposed in a predetermined position for activating the sensing means when the release shaft is rotated.

OBJECTS OF THE INVENTION

It is therefore a primary object of the present invention to provide an electronic sensor for a quick release mechanism in a railcar hand brake.

Another object of the present invention is to provide an electron ic sensor for a quick release mechanism in a railcar hand brake having an electronic signal to notify the train operator that the railcar vertical hand brake has been fully released without having to physically check the hand brake.

Still a further object of the present invention is to provide an electronic sensor for a quick release mechanism in a railcar hand brake that will reduce potential injury to a railcar operator by minimizing the need to climb onto a railcar to determine if the hand brake is released.

In addition to the various objects of the invention that have been described above, various other objects and advantages of the invention will become readily apparent to those persons skilled in the relevant art from the following more detailed description of the invention, particularly, when such description is taken in conjunction with the attached drawing figures and the appended claims.

Figure 1:
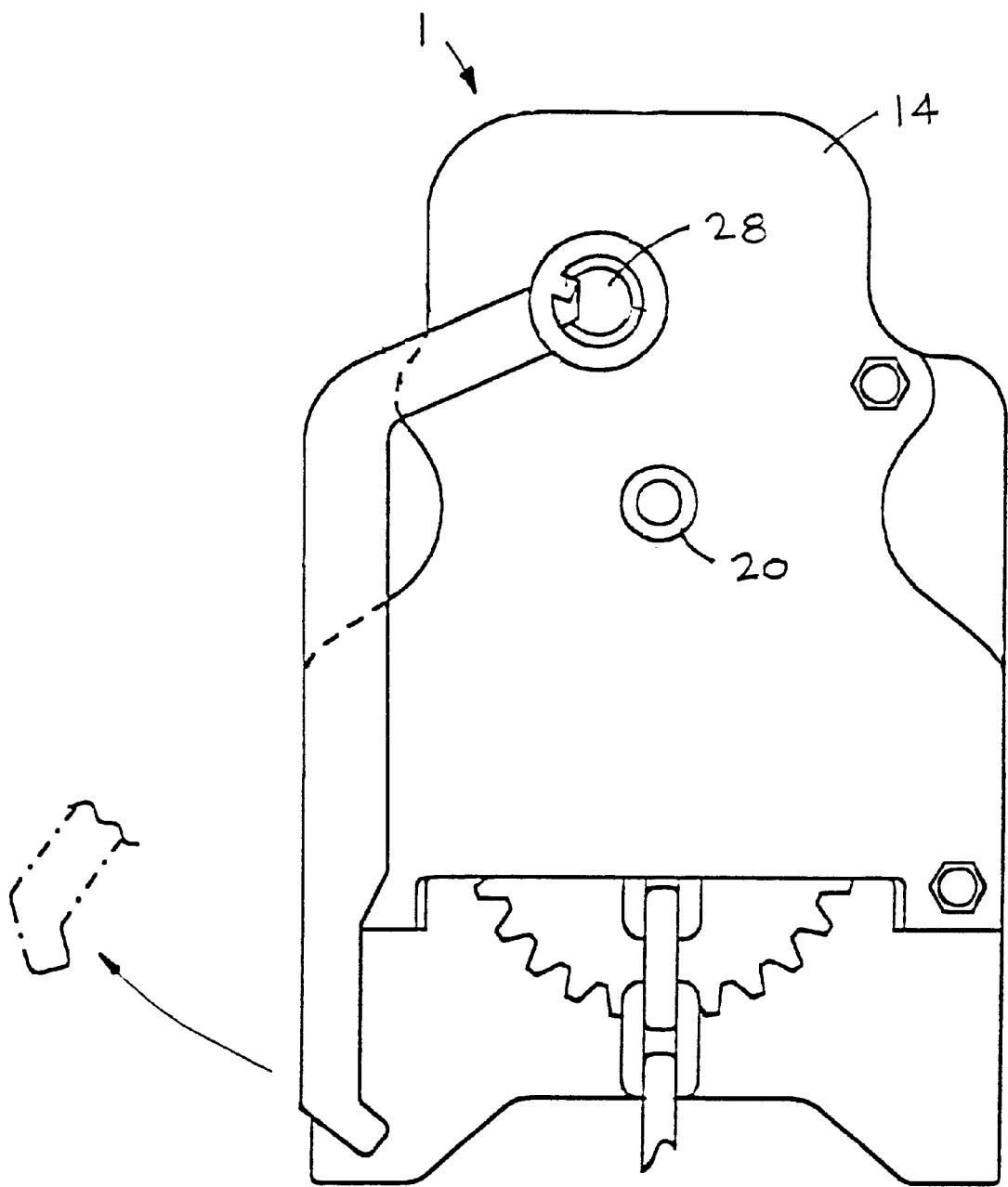
FIG. 1 is a front elevational view of a railcar vertical hand brake of the present invention.

BRIEF DESCRIPTION OF A PRESENTLY PREFERRED AND VARIOUS ALTERNATIVE EMBODIMENTS OF THE PRESENT INVENTION

Prior to proceeding to a more detailed description of the invention, it should be noted that identical components having identical functions have been clearly designated with identical reference numerals for the sake of clarity.

Figure 2:
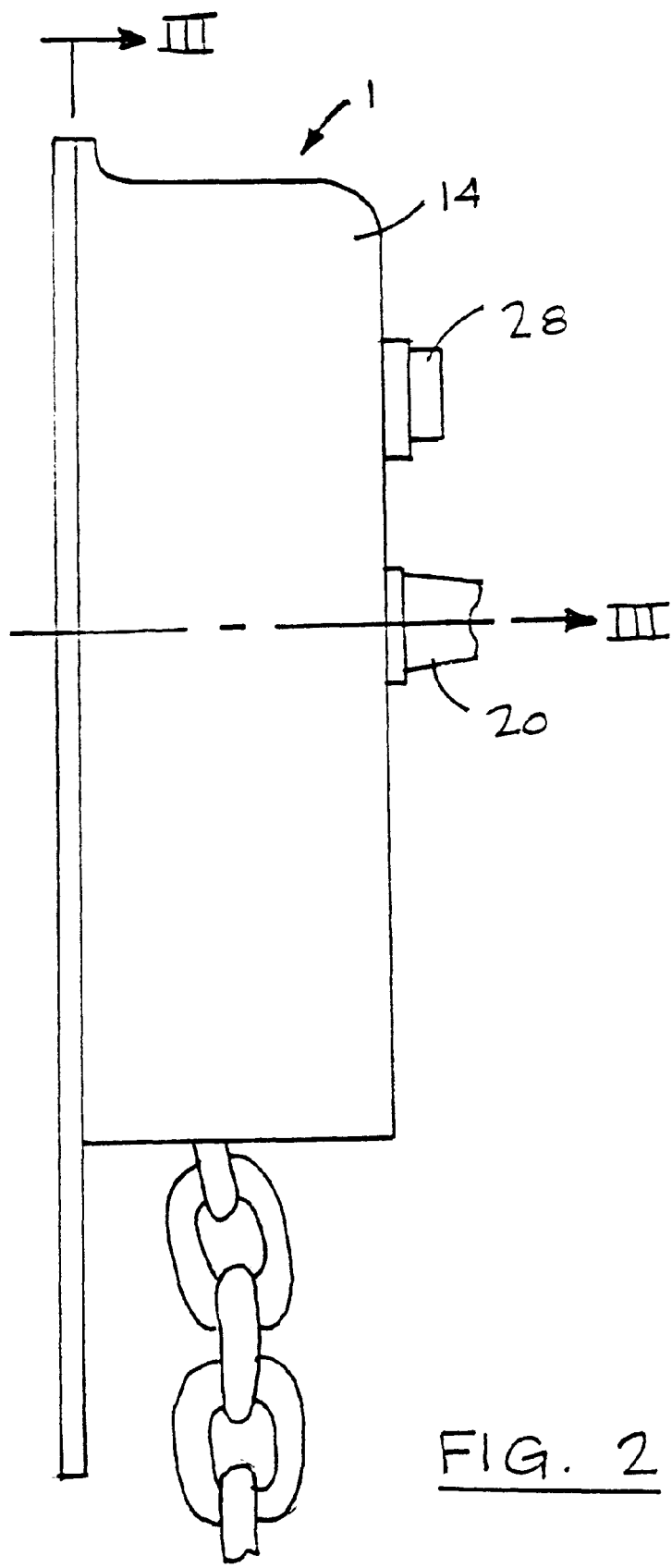
FIG. 2 is a side elevational view of a railcar vertical hand brake of the present invention.
Figure 3:
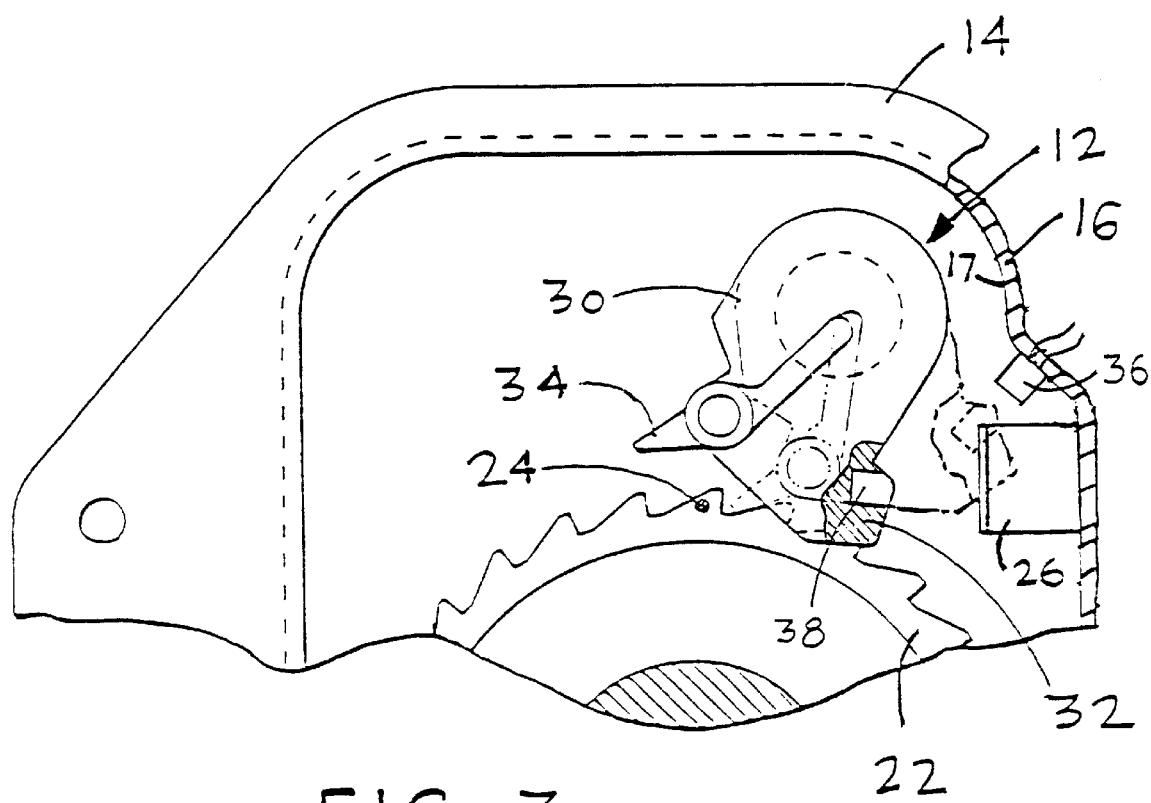
FIG. 3 is a front sectional view taken along the lines of III—III of FIG. 2.

Now refer to FIGS. 1, 2, and 3 of the drawings. Illustrated therein is an electronic sensor, generally designated 10, for a quick release mechanism, generally designed 12, for a railcar vertical hand brake, generally designated 1, having a housing 14 equipped with a flexible clamp 26 mounted on an inside surface 17 of a wall 16 of the housing 14. A release shaft 28 has a member 30 disposed perpendicular to and about the circumference of the release shaft 28. A first element 32 is disposed on the member 30, which interposes with the flexible clamp 26 when the release shaft 28 is rotated to both achieve and maintain a full brake release. A second element 34 is disposed on the member 30 to engage a projection 24 on a ratchet wheel 22 when an operating shaft 20 of the hand brake 1 is rotated to disengage the first element 32 from the flexible clamp 26 to allow for brake application.

The electronic sensor 10 comprises a sensing means 36 disposed in a predetermined position for detecting when the release shaft 28 is rotated into a release position, and for communicating a signal, indicating that the hand brake 1 is in the release position. A means for activating 38 the sensing means 36 when the release shaft 28 is rotated is disposed in a predetermined position. Preferably, the sensing means 36 is a sensor capable of communicating the signal when the sensor 36 is positioned within a sensitivity range of the activating means 38 when the release shaft 28 is rotated. Preferably, the sensor is disposed on at least one of the member 30 and the housing 14. Preferably, the sensor is disposed on the inside surface 17 of the wall 16 of the housing 14. Also preferred is that the sensor is at least one of a magnetic switch and a Hall effect sensor.

The means for activating 38 the sensing means 36 is preferably at least one of a magnetically charged part, and a light beam. Preferably, the activating means 38 is a magnetically charged part. Preferably, the magnetically charged part is on at least one of the member 30 and the housing 14. The magnetically charged part is preferably on the member 30, and is at least one of a magnet and a ferromagnetic material of a predetermined magnetic field strength. Preferably, the magnetically charged part is a magnet, and is at least one of affixed on and embedded in the first element 32 of the member 30. Preferably, the magnet is embedded in the first element 32 of the member 30.

Now refer again to FIGS. 1,2, and 3 of the drawings. Illustrated therein is an electronic sensor, generally designated 10, for a quick release mechanism, generally designed 12, for a railcar vertical hand brake, generally designated 1, having a housing 14 equipped with a flexible clamp 26 mounted on an inside surface 17 of a wall 16 of the housing 14. A release shaft 28 has a member 30 disposed perpendicular to and about the circumference of the release shaft 28. A first element 32 is disposed on the member 30, which interposes with the flexible clamp 26 when the release shaft 28 is rotated to both achieve and maintain a full brake release. A second element. 34 is disposed on the member 30 to engage a projection 24 on a ratchet wheel 22 when an operating shaft 20 of the hand brake 1 is rotated to disengage the first element 32 from the flexible clamp 26 to allow for brake application. The electronic sensor 10 comprises a sensing means 36 disposed in a predetermined position for detecting when the release shaft 28 is rotated into a release position, and for communicating a signal, indicating that the hand brake is in the release position. A magnetically charged part 38 is disposed in a predetermined position for activating the sensing means 36 when the release shaft 28 is rotated.

Preferably, the sensing means 36 is a sensor capable of communicating a signal when the sensor is positioned within a sensitivity range of the magnetically charged part 38 when the release shaft 28 is rotated. Preferably, the sensor is disposed on at least one of the member 30 and the housing 14. Preferably, the sensor is disposed on the inside surface 17 of the wall 16 of the housing 14. Preferably, the sensor is at least one of a magnetic switch and a Hall effect sensor.

The magnetically charged part 38 can be disposed on at least one of the member 30 and the housing 14. Preferably, the magnetically charged part 38 is disposed on the member 30. The magnetically charged part 38 is also at least one of a magnet and a ferromagnetic material of a predetermined magnetic field strength. Preferably, the magnetically charged part 38 is a magnet, and is at least one of affixed on and embedded in the first element 32 of the member 30. Preferably, the magnet is embedded in the first element 32 of the member 30.

Figure 4:
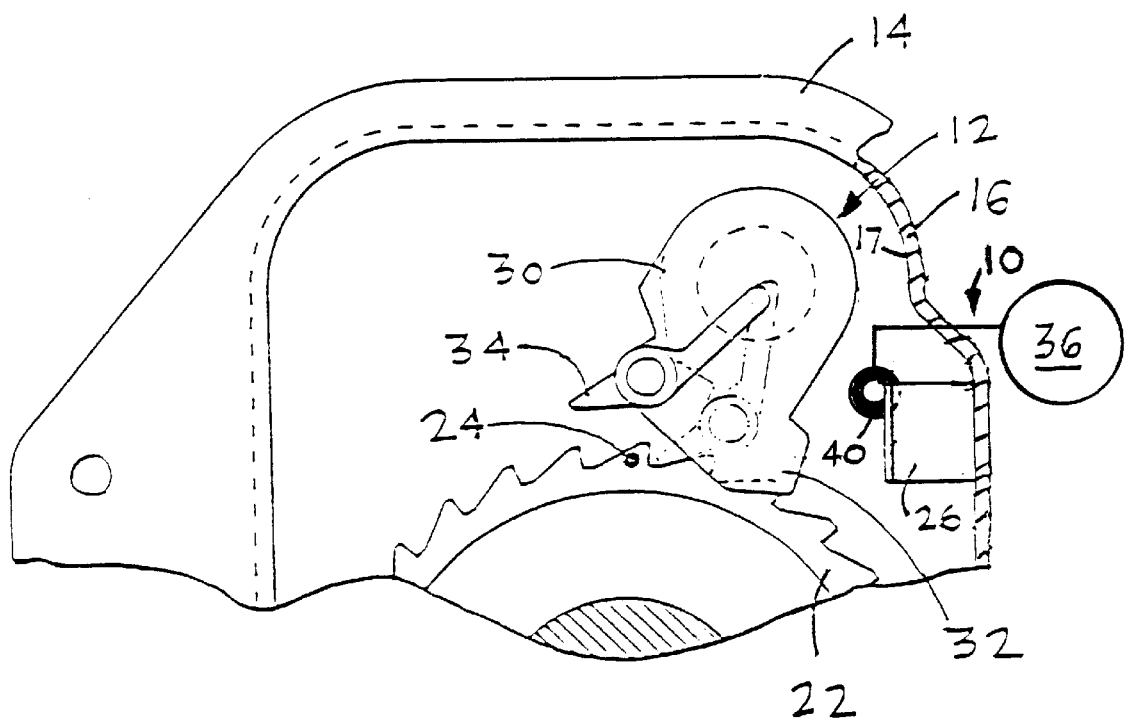
FIG. 4 is a front sectional view taken along the lines of III—III of FIG. 2 illustrating an alternative embodiment of the present invention.

Now refer again more particularly to FIGS. 1,2, and 4 of the drawings. Illustrated therein is an electronic sensor, generally designated 10, for a quick release mechanism, generally designed 12, for a railcar vertical hand brake, generally designated 1, having a housing 14 equipped with a flexible clamp 26 mounted on an inside surface 17 of a wall 16 of the housing 14. A release shaft 28 has a member 30 disposed perpendicular to and about the circumference of the release shaft 28. A first element 32 is disposed on the member 30, which interposes with the flexible clamp 26 when the release shaft 28 is rotated to both achieve and maintain a full brake release. A second element 34 is disposed on the member 30 to engage a projection 24 on a ratchet wheel 22 when an operating shaft 20 of the hand brake 1 is rotated to disengage the first element 32 from the flexible clamp 26 to allow for brake application. The electronic sensor 10 comprises a sensing means 36 disposed in a predetermined position for detecting when the release shaft 28 is rotated into a release position, and for communicating a signal, indicating that the hand brake 1 is in the release position. A light beam 40 is disposed in a predetermined position for activating the sensing means 36 when the release shaft 28 is rotated. Preferably, the light beam 40 radiates perpendicular to the rotational movement of the member 30. The light beam 40 communicates with the sensing means 36. When the release shaft 28 is rotated to release the brakes, the first element 32 of the member 30 interrupts the path of the light beam 40, which activates the sensing means 36.

OPERATION

When full brake release is desired throughout train movement, the release shaft 28 rotated. The first element 32 interposes with the flexible clamp 26, whereby the flexible clamp 26 secures the first element 32. The magnet, or activating means 38, is disposed on the first element 32 of the member 30 and suitably situated such that it is simultaneously driven into a position that locates it within the detection range of the sensing means 36. The sensing means 36 is the sensor that is disposed on the inside surface 17 of the housing 14 wall 16. The magnet activates the sensor, which outputs and transmits a signal to the train operator through an appropriate electrical interface. This signal notifies the train operator that the hand brake 1 is in the fully released position.

When brake application is desired, the operating shaft 20 is rotated in such a direction to move the projection 24 on the ratchet wheel 22 into engagement with the second element 34. This movement disengages the first element 32 from the flexible clamp 26, moving the magnet out of the sensor's detection range. Signal transmission ceases, indicating to the train operator that the hand brake 1 is in the brake application position.

Although the invention has been shown in connection with a certain specific embodiment, it will be readily apparent to those skilled in the art that various changes in form and arrangement of parts and method may be made to suit requirements without departing from the spirit and scope of the invention.

We claim:

1. An electronic sensor for a quick release mechanism in a railcar vertical hand brake, such hand brake having a housing equipped with a flexible clamp mounted on an inside wall of such housing and a release shaft, such release shaft having a member disposed perpendicular to and about a circumference thereof, a first element is disposed on such member which interposes with such flexible clamp when such release shaft is rotated to both achieve and maintain a full brake release and a second element is disposed on such member to engage a projection on a ratchet wheel when an operating shaft of such hand brake is rotated to disengage such first element from such flexible clamp to allow a brake application, said electronic sensor comprising:

(a) a sensing means disposed in a predetermined position for detecting when such release shaft is rotated into a release position and for communicating a signal, indicating that such hand brake is in the release position; and (b) a means disposed in a predetermined position for activating said sensing means when such release shaft is rotated.

2. The electronic sensor according to claim 1 wherein said sensing means is a sensor capable of communicating said signal when said sensor is positioned within a sensitivity range of said activating means when said release shaft is rotated.

3. The electronic sensor according to claim 2 wherein said sensor is disposed on at least one of such member and such housing.

4. The electronic sensor according to claim 3 wherein said sensor is disposed on such housing inside wall surface.

5. The electronic sensor according to claim 4 wherein said sensor is at least one of a magnetic switch and a Hall effect sensor.

6. The electronic sensor according to claim 1 wherein said activating means is at least one of a magnetically charged part and a light beam.

7. The electronic sensor according to claim 6 wherein said activating means is a magnetically charged part.

8. The electronic sensor according to claim 7 wherein said magnetically charged part is on at least one of such member and such housing.

9. The electronic sensor according to claim 8 wherein said magnetically charged part is on such member.

10. The electronic sensor according to claim 9 wherein said magnetically charged part is at least one of a magnet and a ferromagnetic material of a predetermined magnetic field strength.

11. The electronic sensor according to claim 10 wherein said magnetically charged part is a magnet.

12. The electronic sensor according to claim 11 wherein said magnet is at least one of affixed on and embedded in such first element of such member.

13. The electronic sensor according to claim 12 wherein said magnet is embedded in such first element of such member.

14. An electronic sensor for a quick release mechanism in a railcar hand brake, such hand brake having a housing equipped with a flexible clamp mounted on an inside wall of such housing and a release shaft, such release shaft having a member disposed perpendicular to and about a circumference thereof, a first element is disposed on such member which interposes with such flexible clamp when such release shaft is rotated to both achieve and maintain a full brake release and a second element is disposed on such member to engage a projection on a ratchet wheel when an operating shaft of such hand brake is rotated to disengage such first element from such flexible clamp to allow a brake application, said electronic sensor comprising:

(a) a sensing means disposed in a predetermined position for detecting when such release shaft is rotated into a release position and for communicating a signal, indicating that such hand brake is in the release position; and (b) a magnetically charged part disposed in a predetermined position for activating said sensing means when such release shaft is rotated.

15. The electronic sensor according to claim 14 wherein said sensing means is a sensor capable of communicating said signal when said sensor is positioned within a sensitivity range of said magnetically charged part when such release shaft is rotated.

16. The electronic sensor according to claim 15 wherein said sensor is disposed on at least one of such member and such housing.

17. The electronic sensor according to claim 16 wherein said sensor is at least one of a magnetic switch and a Hall effect sensor.

18. The electronic sensor according to claim 14 wherein said magnetically charged part is on at least one of such member and such housing.

19. The electronic sensor according to claim 18 wherein said magnetically charged part is a magnet.

20. An electronic sensor for a quick release mechanism in a railcar hand brake, such hand brake having a housing equipped with a flexible clamp mounted on an inside wall of such housing and a release shaft, such release shaft having a member disposed perpendicular to and about a circumference thereof, a first element is disposed on such member which interposes with such flexible clamp when such release shaft is rotated to both achieve and maintain a full brake release and a second element is disposed on such member to engage a projection on a ratchet wheel when an operating shaft of such hand brake is rotated to disengage such first element from such flexible clamp to allow a brake application, said electronic sensor comprising:

a) a sensing means disposed in a predetermined position for detecting when such release shaft is rotated into a release position and for communicating a signal, indicating that such hand brake is in the release position; and (b) a light beam disposed in a predetermined position for activating said sensing means when such release shaft is rotated.

* * * * *